United States Patent
Howe

(10) Patent No.: US 10,733,618 B2
(45) Date of Patent: Aug. 4, 2020

(54) SYSTEMS AND METHODS FOR DETERMINING AND ANALYZING CHARACTERISTICS OF DEVICES USED IN PAYMENT TRANSACTIONS

(71) Applicant: MasterCard International Incorporated, Purchase, NY (US)

(72) Inventor: Justin X. Howe, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 712 days.

(21) Appl. No.: 14/165,627

(22) Filed: Jan. 28, 2014

(65) Prior Publication Data

US 2015/0213464 A1    Jul. 30, 2015

(51) Int. Cl.
*G06Q 30/02* (2012.01)
*G06Q 20/40* (2012.01)
(Continued)

(52) U.S. Cl.
CPC ......... *G06Q 30/0201* (2013.01); *G06Q 20/12* (2013.01); *G06Q 20/3224* (2013.01); *G06Q 20/405* (2013.01); *G06Q 20/4093* (2013.01)

(58) Field of Classification Search
CPC ........ G06Q 20/40; G06Q 40/00; G06Q 20/04; G06Q 20/10; G06Q 20/382; G06Q 20/4014; G06Q 40/025; G06Q 20/027; G06Q 20/0855; G06Q 20/4016; G06Q 40/04; G06Q 20/12; G06Q 20/28; G06Q 20/354; G06Q 20/00; G06Q 20/105; G06Q 20/16; G06Q 20/24; G06Q 20/34; G06Q 20/342; G06Q 20/3552; G06Q 20/357; G06Q 20/385; G06Q 20/02; G06Q 20/341; G06Q 20/355; G06Q 20/367; G06Q 20/3674; G06Q 20/3829; G06Q 20/4012; G06Q 30/06; G06Q 20/3255; G06Q 20/401; G06Q 20/322; G06Q 20/36; G06Q 40/02; G06Q 20/14; G06Q 20/32; G06Q 20/3223;
(Continued)

(56) References Cited

U.S. PATENT DOCUMENTS 7,819,322 B2    10/2010    Hammad et al.
7,937,467 B2    5/2011    Barber
(Continued)

*Primary Examiner* — Jamie H Austin
(74) *Attorney, Agent, or Firm* — Armstrong Teasdale LLP

(57) ABSTRACT

A device profiling computer system for determining and analyzing characteristics of devices used in payment transactions includes a processor, a device profiling database in communication with the processor, and a memory coupled to the processor. The device profiling computer system is configured to receive a set of first transaction data associated with a first transaction initiated by a cardholder at an online merchant wherein the cardholder initiates the first transaction using a cardholder computing device and wherein the set of first transaction data includes a set of first device characteristic data related to the cardholder computing device, analyze the set of first transaction data to determine a set of device characteristics, and update a device record stored in a device profiling database with the set of first transaction data wherein the device record is associated with the set of device characteristics.

18 Claims, 9 Drawing Sheets

(51) Int. Cl.
*G06Q 20/12* (2012.01)
*G06Q 20/32* (2012.01)

(58) Field of Classification Search
CPC ............ G06Q 20/409; G06Q 30/0207; G06Q 30/0253; G06Q 30/0267; G06Q 30/0273; G06Q 30/0601; G06Q 30/0611; G06Q 30/0633; G06Q 30/08; G06Q 40/12; G06Q 50/188; G06Q 20/023; G06Q 20/20; G06Q 20/204; G06Q 20/206; G06Q 20/227; G06Q 20/3821; G06Q 20/403; G06Q 20/4037; G06Q 20/405; G06Q 30/0201; G06Q 20/4093; G06Q 20/3224; G06Q 20/01
USPC ...................................................... 705/35, 39
See application file for complete search history.

(56) References Cited

U.S. PATENT DOCUMENTS

| | | | |
|---|---|---|---|
| 8,150,968 | B2 | 4/2012 | Barber |
| 8,151,327 | B2 | 4/2012 | Eisen |
| 8,489,506 | B2 | 7/2013 | Hammad et al. |
| 8,539,070 | B2 | 9/2013 | Barber |
| 2002/0087543 | A1* | 7/2002 | Saitou ................ G06Q 20/4012 |
| 2004/0205011 | A1* | 10/2004 | Northington ........ G06Q 20/102 705/35 |
| 2007/0239606 | A1* | 10/2007 | Eisen ................ G06Q 20/3674 705/51 |
| 2008/0133420 | A1 | 6/2008 | Barber |
| 2010/0024017 | A1* | 1/2010 | Ashfield ................ G06F 21/35 726/7 |
| 2011/0010289 | A1* | 1/2011 | Kranzley ............... G06Q 20/10 705/39 |
| 2011/0218860 | A1* | 9/2011 | Barber ................ G06Q 10/00 705/14.53 |
| 2012/0174223 | A1 | 7/2012 | Eisen |
| 2013/0339237 | A1* | 12/2013 | Rich ................ G06Q 20/4016 705/44 |
| 2014/0033317 | A1* | 1/2014 | Barber ............... G06Q 30/0242 726/26 |
| 2014/0172706 | A1* | 6/2014 | Condry ............. G06Q 20/4016 705/44 |
| 2014/0365296 | A1* | 12/2014 | McDonnell ........ G06Q 30/0246 705/14.45 |
| 2015/0074259 | A1* | 3/2015 | Ansari .................... H04L 67/02 709/224 |
| 2015/0213485 | A1* | 7/2015 | Wang ................ G06Q 30/0273 705/14.45 |
| 2015/0302397 | A1* | 10/2015 | Kalgi .................... G06Q 20/36 705/65 |

\* cited by examiner

SYSTEMS AND METHODS FOR DETERMINING AND ANALYZING CHARACTERISTICS OF DEVICES USED IN PAYMENT TRANSACTIONS

BACKGROUND OF THE DISCLOSURE

The field of the disclosure relates generally to characteristics of devices used in payment transactions, and more particularly, to systems and methods for determining and analyzing such characteristics.

In at least some cardholder-initiated financial transactions, the cardholder (e.g., an entity using a payment card such as a credit card, a debit card, or a prepaid card) may purchase or return goods or services from a merchant using computer-based resources associated with the merchant. The computer-based resources may include, for example and without limitation, merchant websites, merchant applications, and third-party websites or applications that facilitate transactions with the merchant. Alternately, the computer-based resources may include any software capable of interaction with the cardholder to facilitate the transfer of merchant goods or services. In many of such financial transactions, the cardholder interacts with the merchant resources using a cardholder computing device. Each cardholder computing device may have a variety of device characteristics which may vary across cardholders and transactions. Such device characteristics may be useful in analysis of the transaction and the cardholder computing device.

BRIEF DESCRIPTION OF THE DISCLOSURE

In one aspect, a computer-implemented method for determining and analyzing characteristics of devices used in payment transactions is provided. The method is implemented by a device profiling computer system coupled to a memory and in communication with a device profiling database. The method includes receiving at the device profiling computer system a set of first transaction data associated with a first transaction initiated by a cardholder at an online merchant wherein the cardholder initiates the first transaction using a cardholder computing device and wherein the set of first transaction data includes a set of first device characteristic data related to the cardholder computing device, analyzing the set of first transaction data to determine a set of device characteristics, and updating a device record stored in a device profiling database with the set of first transaction data wherein the device record is associated with the set of device characteristics.

In another aspect, a device profiling computer system for determining and analyzing characteristics of devices used in payment transactions is provided. The device profiling computer system includes a processor, a device profiling database in communication with the processor, and a memory coupled to the processor. The device profiling computer system is configured to receive a set of first transaction data associated with a first transaction initiated by a cardholder at an online merchant wherein the cardholder initiates the first transaction using a cardholder computing device and wherein the set of first transaction data includes a set of first device characteristic data related to the cardholder computing device, analyze the set of first transaction data to determine a set of device characteristics, and update a device record stored in a device profiling database with the set of first transaction data wherein the device record is associated with the set of device characteristics.

In a further aspect, computer-readable storage media for determining and analyzing characteristics of devices used in payment transactions is provided. The computer-readable storage media has computer-executable instructions embodied thereon. When executed by at least one processor, the computer-executable instructions cause the processor to receive a set of first transaction data associated with a first transaction initiated by a cardholder at an online merchant wherein the cardholder initiates the first transaction using a cardholder computing device and wherein the set of first transaction data includes a set of first device characteristic data related to the cardholder computing device, analyze the set of first transaction data to determine a set of device characteristics, and update a device record stored in a device profiling database with the set of first transaction data wherein the device record is associated with the set of device characteristics.

BRIEF DESCRIPTION OF THE DRAWINGS

The figures listed below show example embodiments of the methods and systems described herein.

FIG. 1 is a schematic diagram illustrating an example multi-party payment card industry system for enabling ordinary payment-by-card transactions, including payment-by-card transactions made by cardholders using cardholder computing devices to make transactions at an online merchant, in which merchants and card issuers do not necessarily have a one-to-one relationship.

FIG. 2 is a simplified block diagram of an example device profiling computer system used to determine and analyze characteristics of devices used in payment transactions including a plurality of computer devices in accordance with one example embodiment of the present disclosure.

FIG. 3 is an expanded block diagram of an example embodiment of server architecture of the device profiling computer system used to determine and analyze characteristics of devices used in payment transactions including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is a simplified block diagram of an example embodiment of a system for monitoring and receiving a set of first device characteristic data related to a cardholder computing device used in payment card transactions.

FIG. 7 is a simplified block diagram of an example embodiment of a system for determining and analyzing characteristics of cardholder computing devices used in payment card transactions.

FIG. 8 is a simplified diagram of an example method of determining and analyzing characteristics of devices used in payment transactions using the device profiling computer system of FIG. 2.

FIG. 9 is a diagram of components of one or more example computing devices that may be used in the environment shown in FIGS. 6 and 7.

Figure 1:
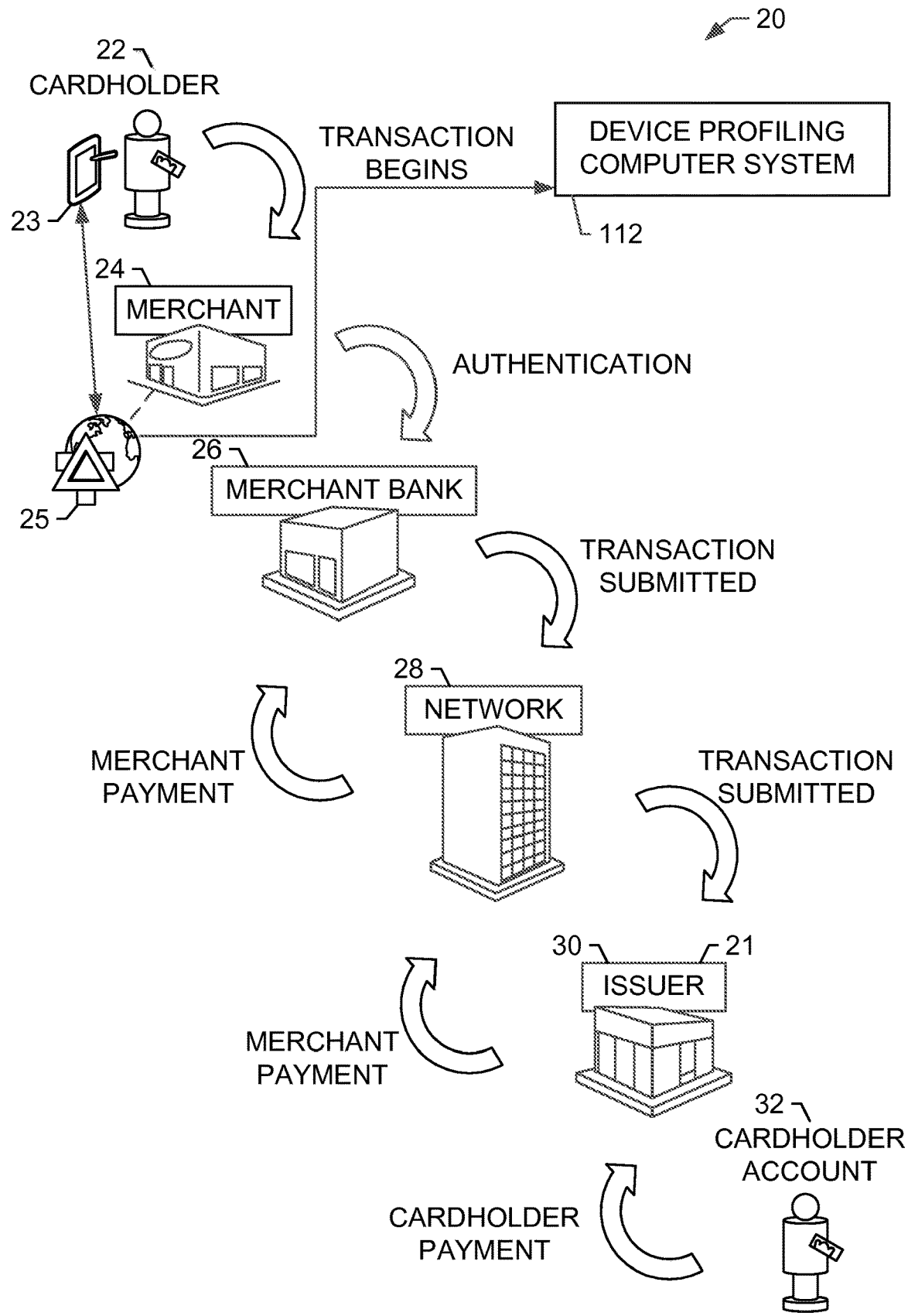
FIGS. 1-9 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

This subject matter described herein relates generally to profiling computing devices used by cardholders during cardholder transactions. Transaction data associated with cardholder-initiated financial transactions is received along with device characteristic data by a device profiling computer system. Specifically, the methods and systems described herein include receiving a set of first transaction data associated with a first transaction initiated by a cardholder at an online merchant wherein the cardholder initiates the first transaction using a cardholder computing device and wherein the set of first transaction data includes a set of first device characteristic data related to the cardholder computing device, determining, based on the set of first device characteristic data, a set of device characteristics, and updating a device record stored in a device profiling database with the set of first transaction data, wherein the device record is associated with the set of device characteristics.

In at least some cardholder-initiated financial transactions, the cardholder (e.g., an entity using a payment card such as a credit card, a debit card, or a prepaid card) may purchase or return goods or services (collectively referred to herein as "products") from a merchant at an online presence of associated with a merchant ("online merchant"). In many examples, the cardholder conducts the financial transaction at the online merchant using a computing device ("cardholder computing device"). Individual device characteristics of cardholder computing devices may vary substantially. For example, cardholders may use a variety of hardware types, software, browsers, operating systems, display attributes, configuration attributes, software components or plugins, and networking attributes including internet protocol addresses and internet service providers. Analysis of such device attributes may be beneficial to a variety of parties including merchants, banks, payment networks, advertisers, device manufacturers, device servicers, and software manufacturers. For example, a particular online merchant may determine that transactions of particular products may be heavily or exclusively correlated with particular device configurations. This information may indicate that such device configurations are correlated with particular cardholder characteristics which are further associated with purchases of the particular products. Alternately, a particular online merchant may determine that certain device configurations are never used to purchase products. This information may indicate that the online merchant is not effectively supporting certain device configurations. Further types and examples of analysis performed may be performed, as discussed below and herein. The systems and methods described herein accordingly facilitate the receipt of such device characteristic data with transaction data, the extraction of such device characteristic data, the management of database systems tracking such device characteristic data in the presence of transaction data. The systems and methods described also facilitate the generation of analysis based upon such device characteristic data.

The systems described herein are configured to receive a set of first transaction data associated with a first transaction initiated by a cardholder at an online merchant. The set of first transaction data is received at a device profiling computer system. In the example embodiment, the device profiling computer system is in communication with a payment network used to facilitate financial transactions, as described below. Accordingly, the set of first transaction data may be received at the payment network and subsequently routed to the device profiling computer system. The online merchant may include any online presence associated with a merchant including, without limitation, electronic commerce stores, applications used to facilitate transactions with merchants, or any other online presence associated with a merchant that allows a cardholder to purchase products electronically through the use of a cardholder computing device. The cardholder initiates the first transaction using a cardholder computing device. As used herein, the cardholder computing device may be any suitable computing device including, for example and without limitation, a desktop computer, a laptop computer, a portable computer, a tablet computer, a smart phone, a personal digital assistant, a hybrid phone/tablet ("phablet"), or any other suitable computing device. The set of first transaction data includes a set of first device characteristic data related to the cardholder computing device. In the example embodiment, the set of first device characteristic data is embedded in an ISO® 8583 compliant message. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. As described below and herein, ISO® 8583 compliant messages include a plurality of specified locations for storing Private Data Elements. For example, data elements 61, 62, 63, 120, 121, 122, and 123 are all designated as private and can be embedded with data. Accordingly, in at least one example, the set of first device characteristic data is embedded in the ISO® 8583 compliant message that is generated when the cardholder initiates a transaction at the online merchant. In at least one example, the online merchant tracks characteristics related to the cardholder computing device and includes the set of first device characteristic data in the first set of transaction data that is then transferred from the online merchant to other entities within the payment network, as described below. In alternative examples, other entities including browser, hardware, or software providers may track characteristics related to the cardholder computing device and provide such data to the online merchant before or during the financial transaction so that the online merchant can embed the set of first device characteristic data in the set of first transaction data. In additional examples, other entities including browser, hardware, or software providers may track characteristics related to the cardholder computing device and provide such data to other entities within the payment network.

The set of first device characteristic data may include, for example and without limitation, the operating system used by the cardholder computing device in the initiating the first transaction, the browser operating system used by the cardholder computing device in the initiating the first transaction, a plurality of hardware characteristics associated with the cardholder computing device in the initiating the first transaction, the internet protocol address associated with the cardholder computing device in the initiating the first transaction, the internet service provider associated with the cardholder computing device in the initiating the first transaction, display attributes and characteristics used by a browser used by the cardholder computing device in the initiating the first transaction, configuration attributes used by a browser used by the cardholder computing device in the initiating the first transaction, and software components used by the cardholder computing device in the initiating the first transaction.

In one example, operating system information may also include versions and subversions associated with a particular operating system distribution. For example, the operating system information may include the software development company, the distribution name, the version identifier, the subversion identifier, and the release date for the operating system. Similarly, browser operating system information may include versions and subversions associated with a particular browser operating system distribution. The browser operating system information may include the software development, the distribution name, the version identifier, the subversion identifier, and the release date for the browser operating system. A plurality of hardware characteristics may include, for example and without limitation, a manufacturer associated with the cardholder computing device, a model name or identifier associated with the cardholder computing device, processor attributes for the cardholder computing device, memory attributes for the cardholder computing device, media input characteristics for the cardholder computing device, screen display characteristics for the cardholder computing device, storage for the cardholder computing device, and any other information related to the hardware of the cardholder computing device.

The internet protocol address associated with the cardholder computing device may be stored in internet protocol version 4, internet protocol version 6, or any other suitable internet protocol capable of identifying the interface and the address location of the cardholder computing device. The internet service provider associated with the cardholder computing device may be identified using any appropriate identifier. In at least some examples, the internet protocol address may be used to determine a geographic location associated with the cardholder computing device. The geographic location may be determined by, for example, the online merchant, payment network systems, and the device profiling computer system. In the example embodiment, the device profiling computer system determines the geographic location. In other embodiments, the geographic location may be determined by other systems and embedded in the ISO® 8583 compliant message.

In additional examples, the internet protocol address may be used to determine a network context associated with the cardholder computing device. For example, a particular internet protocol address may identify that the cardholder computing device is used in a public network, a home network, or an office network. The network context may be determined by, for example, the online merchant, payment network systems, and the device profiling computer system. In the example embodiment, the device profiling computer system determines the network context. In other embodiments, the network context may be determined by other systems and embedded in the ISO® 8583 compliant message.

Similarly, the internet service provider information may be used to determine the network context associated with the cardholder computing device and the geographic location associated with the cardholder computing device. As above, such geographic location or network context may be determined by the online merchant, payment network systems, and the device profiling computer system.

Display attributes and characteristics may include any information related to the display of information to the cardholder on the cardholder computing device. Accordingly, such display attributes and characteristics may include, without limitation, language selections, time zone selection, time format selection, date format selection, character set format, fonts, font formats, styles, and any other display attributes and characteristics used by the cardholder computing device.

In at least some examples, the cardholder computing device may be configured to provide an internet browser to access the online merchant. In such cases, configuration attributes used by a browser may include, for example and without limitation, the use of browser cookies, browser versions, browser plugins, browser software, script activation for scripts such as JavaScript, MIME type support, and installed browser toolbars.

The device profiling computer system analyzes the set of first transaction data to determine a set of device characteristics. The device profiling computer system extracts the embedded data from the set of first transaction data by searching through the set of first transaction data to identify the set of device characteristics. The set of first transaction data may, as described above and herein, store the set of first device characteristic data in a variety of locations. Further, the set of first device characteristic data may be stored in a variety of formats depending upon the methods and parties involved in creating and storing the set of first transaction data. For example, different online merchants may encode and store device characteristic data in different manners. Accordingly, the device profiling computer system may use any appropriate data processing methods and algorithms including, for example and without limitation, natural language processing (NLP) methods, extraction transformation and loading (ETL) methods, lookup tables, linked lists, and any other suitable method or algorithm.

The device profiling computer system is also associated with a device profiling database. The device profiling database may be stored and executed at the device profiling computer system or an external networked computer system. The device profiling database contains a plurality of device records. Each device record is associated with at least one set of device characteristics. For example, a particular device record may be written for cardholder computing devices running on Apple™ tablet devices using the Apple iOS™ and serving internet content over Safari™ with a particular set of display attributes. This particular device record further includes a history of transactions associated with the particular set of device characteristics. The device profiling computer system updates the device profiling database with the set of first transaction data including the set of device characteristics. Accordingly, a particular device record is updated based upon the received set of first transaction data. In at least some examples, the device profiling computer system further processes set of first transaction data to store details of transactions or categories of transactions in the device record. For example, the device record may include individual entries regarding goods purchased, total amounts of purchase, time and date of purchase, and any other type of transaction data relevant. Additionally, the device record may also include information regarding the category of the transaction. For example, the device record may differentiate between financial transactions that were authorized/approved, declined, fulfilled, charged back, or included customer disputes. As described herein, such information may be useful in further profiling of device characteristics. For example, particular a particular set of device characteristics may be more commonly associated with declined transactions. Such information may be beneficial to the operations and support team associated with the online merchant. In an example embodiment, the device profiling computer system is further configured to generate a plurality of device profiles. The device profiles include the likelihood of a particular device with particular device characteristics to be associated with each transaction category.

In at least some examples, the device profiling computer system also receives a plurality of advertising data associated with the online merchant. The plurality of advertising data may be received from, for example, an advertising network, the online merchant, or any other party capable of capturing, receiving, or providing advertising data to the device profiling computer system. The plurality of advertising data may include, for example and without limitation, the history of online advertisements presented to the cardholder computing device including identifiers for such online advertisements, online merchants associated with such online advertisements, times and dates of the presentation of such online advertisements, and identifiers associated with the cardholder computing device. Accordingly, the plurality of advertising data includes information regarding the display of particular online advertisements associated with the online merchant. Accordingly, the device profiling computer system processes the plurality of advertising data and the plurality of device records stored in the device profiling database to determine a conversion rate associated with a computing device having configuration attributes of each device record. In one example, a conversion rate associated with a particular advertising creative presented to cardholders using a particular configuration of cardholder computing devices may be determined. For example, cardholder computing devices running on Apple™ tablet devices using the Apple iOS™ and serving internet content over Safari™ with a particular set of display attributes may have a conversion rate of 5% for a particular advertising creative while cardholder computing devices running on phablet devices using the Android OS™ and serving internet content over Chrome™ with a particular set of display attributes may have a conversion rate of 7.5%. In this example, an advertiser or a merchant may be able to use such information to more appropriately generate and advertise advertising creatives to the most responsive users. (Apple, iOS, and Safari are trademarks of Apple of Cupertino, Calif.; Android and Chrome are trademarks of Google of Mountain View, Calif.).

The device profiling computer system is also configured to analyze the device profiling database to generate at least one analytic output. The at least one analytic output may include, for example and without limitation, time-segmented reports showing the proportion of cardholders interacting with an online merchant further segmented by device characteristics, time-segmented reports showing the proportion of cardholders initiating approved financial transactions with an online merchant further segmented by device characteristics, time-segmented reports showing the proportion of cardholders initiating declined financial transactions with an online merchant further segmented by device characteristics, and time-segmented reports showing the proportion of cardholders initiating approved financial transactions that are charged back with an online merchant further segmented by device characteristics. In some examples, the analytic output is transmitted to a recipient such as an advertiser, an online merchant, a software development company, and an advertising network.

The device profiling computer system is further configured to generate a device configuration transaction report. The device configuration transaction report includes a plurality of transaction data associated with a plurality of transactions segmented based upon at least one device characteristic. In other words, the device configuration transaction report includes a breakdown of transaction types (e.g., authorizations, charge backs, declines) based upon at least one device characteristic.

Described in detail herein are example embodiments of systems and methods for determining and analyzing characteristics of devices used in payment transactions. The systems and methods facilitate, for example, receiving a set of first transaction data associated with a first transaction initiated by a cardholder at an online merchant wherein the cardholder initiates the first transaction using a cardholder computing device wherein the set of first transaction data includes a set of first device characteristic data related to the cardholder computing device, analyzing the set of first transaction data to determine a set of device characteristics, and updating a device record stored in a device profiling database with the set of first transaction data wherein the device record is associated with the set of device characteristics.

A technical effect of the systems and methods described herein include at least one of (a) improving the support of online merchants for a variety of cardholder computing devices with a variety of device characteristics or device configurations; (b) improving the applications, user experience, and advertising provided to a variety of cardholder computing devices with a variety of device characteristics or device configurations; (c) improving the merchandising strategy of online merchants directed to a variety of cardholder computing devices with a variety of device characteristics or device configurations; and (d) providing analytics of cardholder initiated transactions at online merchants based upon, at least partially, device characteristics or device configurations.

More specifically, the technical effects can be achieved by performing at least one of the following steps: (a) receiving, at the device profiling computer system, a set of first transaction data associated with a first transaction initiated by a cardholder at an online merchant, wherein the cardholder initiates the first transaction using a cardholder computing device, wherein the set of first transaction data includes a set of first device characteristic data related to the cardholder computing device; (b) analyzing the set of first transaction data to determine a set of device characteristics; (c) updating a device record stored in a device profiling database with the set of first transaction data, wherein the device record is associated with the set of device characteristics; (d) analyzing the device profiling database to generate at least one analytic output; (e) determining at least one of an operating system used by the cardholder computing device in the initiating the first transaction, a browser operating system used by the cardholder computing device in the initiating the first transaction, hardware characteristics associated with the cardholder computing device in the initiating the first transaction, an internet protocol address associated with the cardholder computing device in the initiating the first transaction, an internet service provider associated with the cardholder computing device in the initiating the first transaction, display attributes and characteristics used by a browser used by the cardholder computing device in the initiating the first transaction, configuration attributes used by a browser used by the cardholder computing device in the initiating the first transaction, and software components used by the cardholder computing device in the initiating the first transaction; (f) determining, based upon the internet protocol address, at least one of a geographic location associated with the cardholder computing device and an internet service provider associated with the cardholder computing device; (g) determining, based upon the internet protocol address, a network context associated with the cardholder computing device; (h) determining a transaction category associated with the first transaction based upon the set of first transaction data and updating the device record with the set of first transaction data and the transaction category; (i) generating a plurality of device profiles wherein the device profiles include the likelihood of a particular device to be associated with each transaction category; (j) receiving a plurality of advertising data associated with the online merchant and processing the plurality of advertising data and the set of device characteristics to determine a conversion rate associated with a computing device having configuration attributes of the device characteristics; and (k) generating a device configuration transaction report, wherein the device configuration transaction report includes a plurality of transaction data associated with a plurality of transactions segmented based upon at least one device characteristic.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the determination and analysis of characteristics of devices used in payment transactions.

FIG. 1 is a schematic diagram illustrating an example multi-party transaction card industry system 20 for enabling ordinary payment-by-card transactions, including payment-by-card transactions made by cardholders using cardholder computing devices to make transactions at an online merchant, in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. In the example embodiment, cardholder 22 also uses a cardholder computing device 23. As described herein, cardholder computing device 23 is associated with a plurality of device characteristics including, for example and without limitation, hardware attributes, operating system information, browser information, software information, network connectivity information, and display attributes. By using cardholder computing device 23, cardholder 22 may purchase goods and services ("products") at a variety of online stores, applications, and other internet commerce presences. Cardholder 22 may make such purchases using electronic forms of the transaction card and, more specifically, by providing data related to the transaction card (e.g., the transaction card number, expiration date, associated postal code, and security code) to make transactions at such online stores, applications, and other internet commerce presences. In the example embodiment, and herein, cardholder 22 interacts with an online presence associated with merchant 24, online merchant 25. Cardholder 22 interacts with online merchant 25 using cardholder computing device 23. In one example, cardholder 22 navigates to an electronic commerce site representative of online merchant 25. In another example, cardholder 22 uses an application provided by merchant 24 or a party associated with merchant 24 to purchase products of merchant 24 at online merchant 25. In other examples, online merchant 25 may similarly allow cardholder 22 to use cardholder computing device 23 to return products, dispute charges associated with products, and make any other financial transaction with merchant 24. In addition to allowing cardholder 22 to initiate transactions related to products, online merchant 25 is additionally capable of monitoring, storing, and transmitting device characteristics associated with cardholder computing device 23. Online merchant 25 determines such device characteristics based upon the communication between cardholder computing device 23 and online merchant 25. As cardholder computing device 23 requests information including, for example, web content, cardholder computing device 23 also provides device characteristics to facilitate receiving web content suitable for display on cardholder computing device 23. Accordingly, cardholder computing device 23 may provide a plurality of information regarding cardholder computing device 23 including device characteristics. In the example embodiment, online merchant 25 monitors device characteristics, stores device characteristics, and transmits device characteristics. In alternative embodiments, other parties may facilitate the monitoring of device characteristics by receiving such information and transmitting it along. For example, merchant bank 26, network 28, and issuer 30 may all receive device characteristics from online merchant 25, exchange such information between one another, and additionally provide device characteristics to device profiling computer system 112, as described further below.

To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. In the example embodiment, online merchant 25 receives cardholder's 22 account information as provided by cardholder 22 using cardholder computing device 23. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24, via, in the example embodiment, online merchant 25.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, such additional data may also include device characteristics associated with cardholder computing device 23.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch,"

which is settled as a group. More specifically, a transaction is typically settled between issuer bank 30 and interchange network 28, and then between interchange network 28 and merchant bank 26, and then between merchant bank 26 and merchant 24.

As described below in more detail, device profiling computer system 112 may be used to determine and analyze characteristics of devices used in payment transactions. Although the systems described herein are not intended to be limited to facilitate such applications, the systems are described as such for exemplary purposes.

Figure 2:
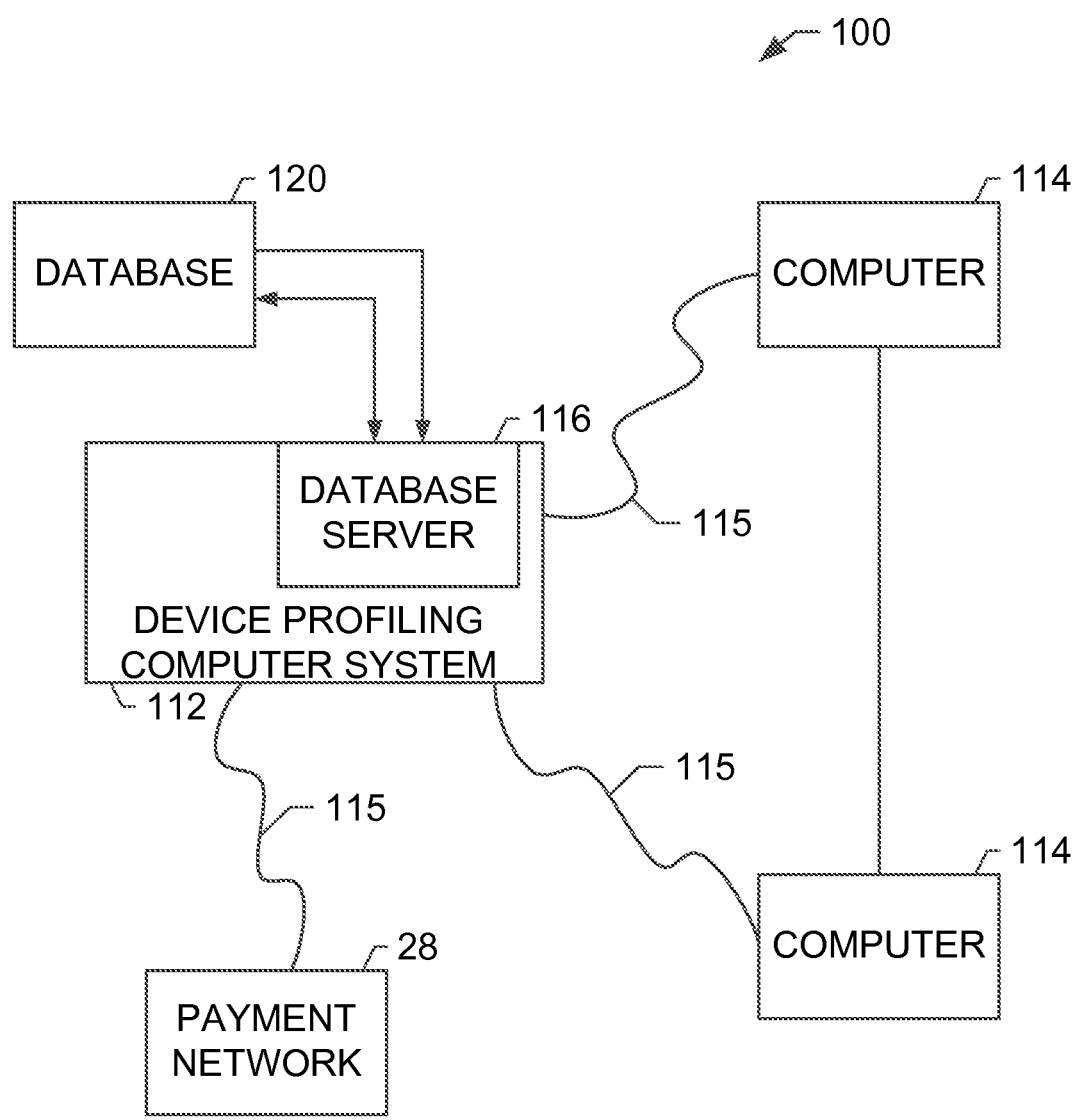

FIG. 2 is a simplified block diagram of an example computer system 100 used to determine and analyze characteristics of devices used in payment transactions including a plurality of computer devices connected in communication in accordance with the present disclosure. In the example embodiment, system 100 is used for receiving a set of first transaction data associated with a first transaction initiated by a cardholder at an online merchant wherein the cardholder initiates the first transaction using a cardholder computing device wherein the set of first transaction data includes a set of first device characteristic data related to the cardholder computing device, analyzing the set of first transaction data to determine a set of device characteristics, and updating a device record stored in a device profiling database with the set of first transaction data wherein the device record is associated with the set of device characteristics, as described herein. In other embodiments, the applications may reside on other computing devices (not shown) communicatively coupled to system 100, and may determine and analyze characteristics of devices used in payment transactions using system 100.

More specifically, in the example embodiment, system 100 includes a device profiling computer system 112, and a plurality of client sub-systems, also referred to as client systems 114, connected to device profiling computer system 112. In one embodiment, client systems 114 are computers including a web browser, such that device profiling computer system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on device profiling computer system 112 and can be accessed by potential users at one of client systems 114 by logging onto device profiling computer system 112 through one of client systems 114. In an alternative embodiment, database 120 is stored remotely from device profiling computer system 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. In the example embodiment, database 120 additionally stores device characteristics associated with cardholder computing devices 23 (shown in FIG. 1) and accordingly functions as a device profiling database, as described herein.

In the example embodiment, one of client systems 114 may be associated with acquirer bank 26 (shown in FIG. 1) while another one of client systems 114 may be associated with issuer bank 30 (shown in FIG. 1). Device profiling computer system 112 may be associated with interchange network 28. In the example embodiment, device profiling computer system 112 is associated with a network interchange, such as interchange network 28, and may be referred to as an interchange computer system. Device profiling computer system 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
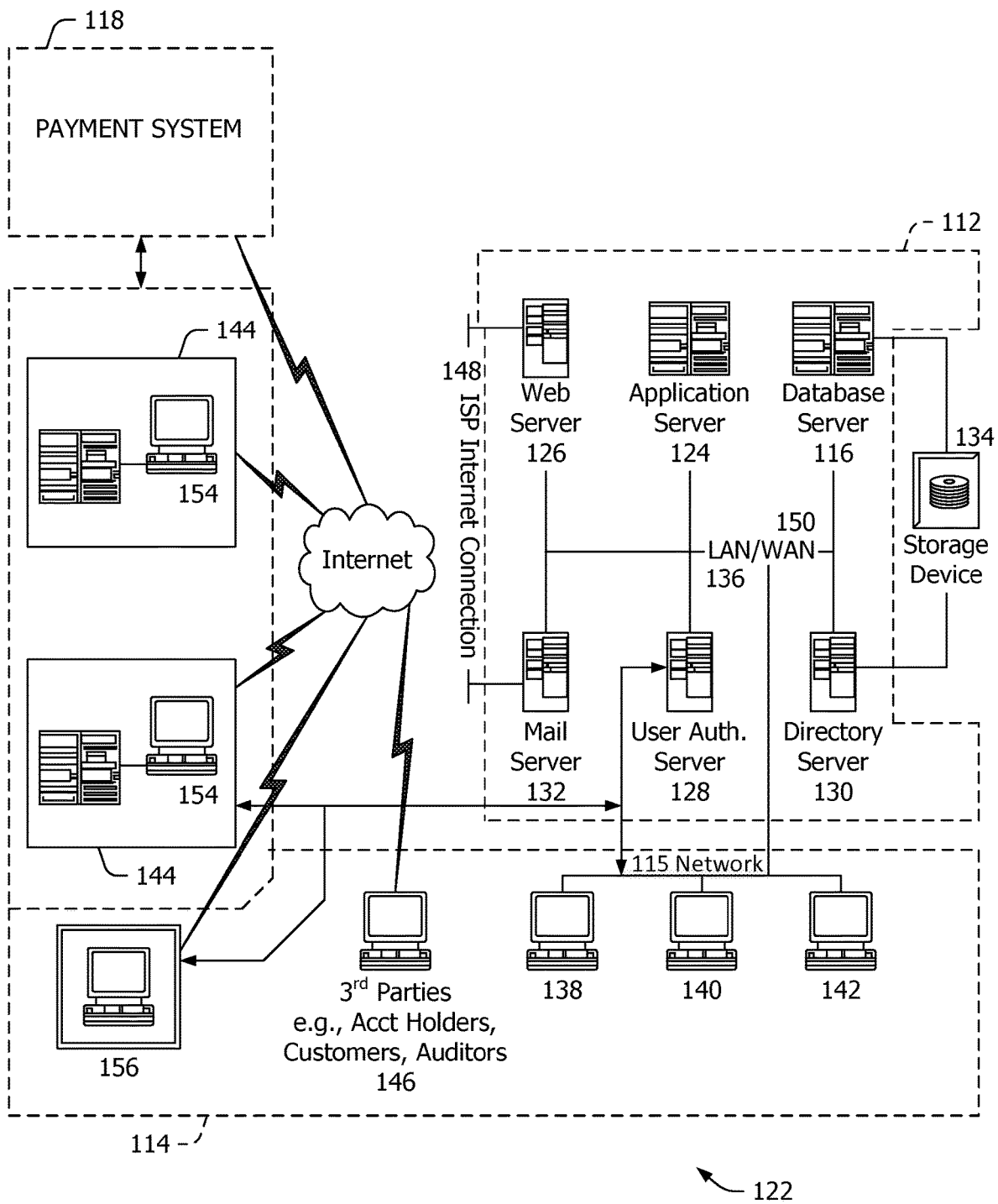

FIG. 3 is an expanded block diagram of an example embodiment of a computer server system architecture of a processing system 122 used to determine and analyze characteristics of devices used in payment transactions including other computer devices in accordance with one embodiment of the present disclosure. Components in system 122, identical to components of system 100 (shown in FIG. 2), are identified in FIG. 3 using the same reference numerals as used in FIG. 2. System 122 includes device profiling computer system 112, client systems 114, and payment systems 118. Device profiling computer system 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Device profiling computer system 112 is configured to be operated by various individuals including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. Device profiling computer system 112 is also configured to be communicatively coupled to payment systems 118. Payment systems 118 include computer systems associated with merchant bank 26, interchange network 28, issuer bank 30 (all shown in FIG. 1), and interchange network 28. Additionally, payments systems 118 may include computer systems associated with acquirer banks and processing banks. Accordingly, payment systems 118 are configured to communicate with device profiling computer system 112 and provide transaction data as discussed below.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with device profiling computer system 112.

Also, in the example embodiment, web server 126, application server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, application server 124, database server 116, and/or directory server 130. User authentication server 128 may communicate with remotely located client systems, including a client system 156. User authentication server 128 may be configured to communicate with other client systems 138, 140, and 142 as well.

Figure 4:
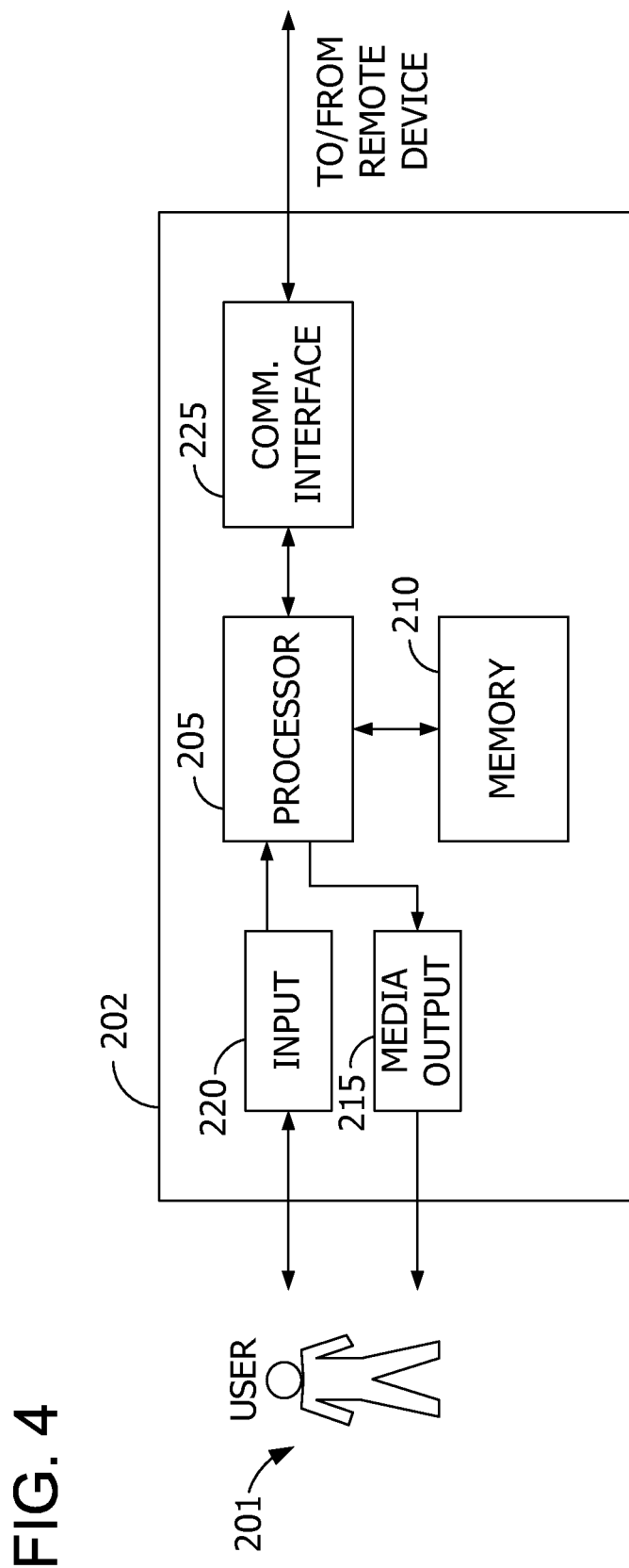

FIG. 4 illustrates an example configuration of a user system 202, such as cardholder computing device 23 (shown in FIG. 1) operated by a user 201, such as cardholder 22 (shown in FIG. 1). User system 202 may include, but is not limited to, cardholder computing device 23, client systems 114, 138, 140, and 142, payment systems 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as device profiling computer system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from device profiling computer system 112. A client application allows user 201 to interact with a server application from device profiling computer system 112.

As described herein, user system 202 may be associated with a variety of device characteristics. For example device characteristics may vary in terms of the operating system used by cardholder computing device 202 in the initiating the first transaction, the browser operating system used by cardholder computing device 202 in the initiating the first transaction, a plurality of hardware characteristics associated with cardholder computing device 202 in the initiating the first transaction, the internet protocol address associated with cardholder computing device 202 in the initiating the first transaction, the internet service provider associated with cardholder computing device 202 in the initiating the first transaction, display attributes and characteristics used by a browser used by cardholder computing device 202 in the initiating the first transaction, configuration attributes used by a browser used by cardholder computing device 202 in the initiating the first transaction, and software components used by cardholder computing device 202 in the initiating the first transaction. As further described herein, device profiling computer system 112 (shown in FIG. 1) is capable of receiving device characteristic data related to user system 202 and analyzing such data as described herein.

Figure 5:
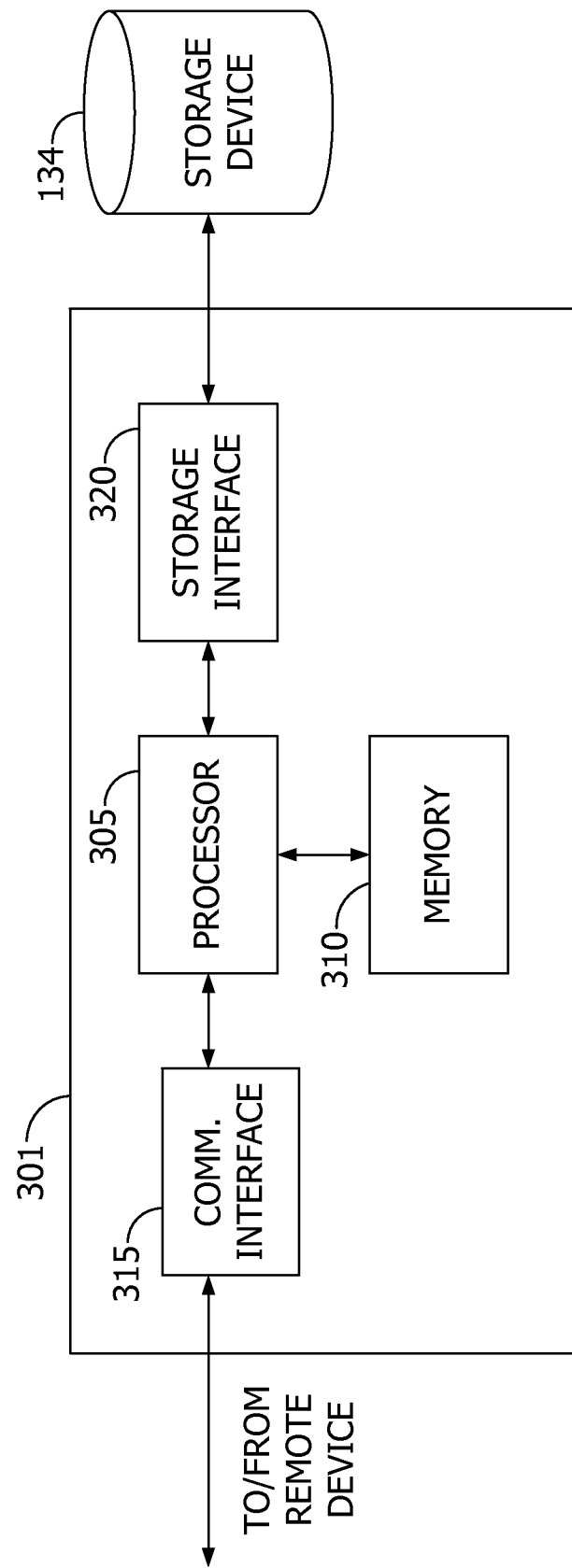

FIG. 5 illustrates an example configuration of a server system 301 such as device profiling computer system 112 (shown in FIGS. 2 and 3). Server system 301 may include, but is not limited to, database server 116, transaction server 124, web server 126, user authentication server 128, directory server 130, and mail server 132. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
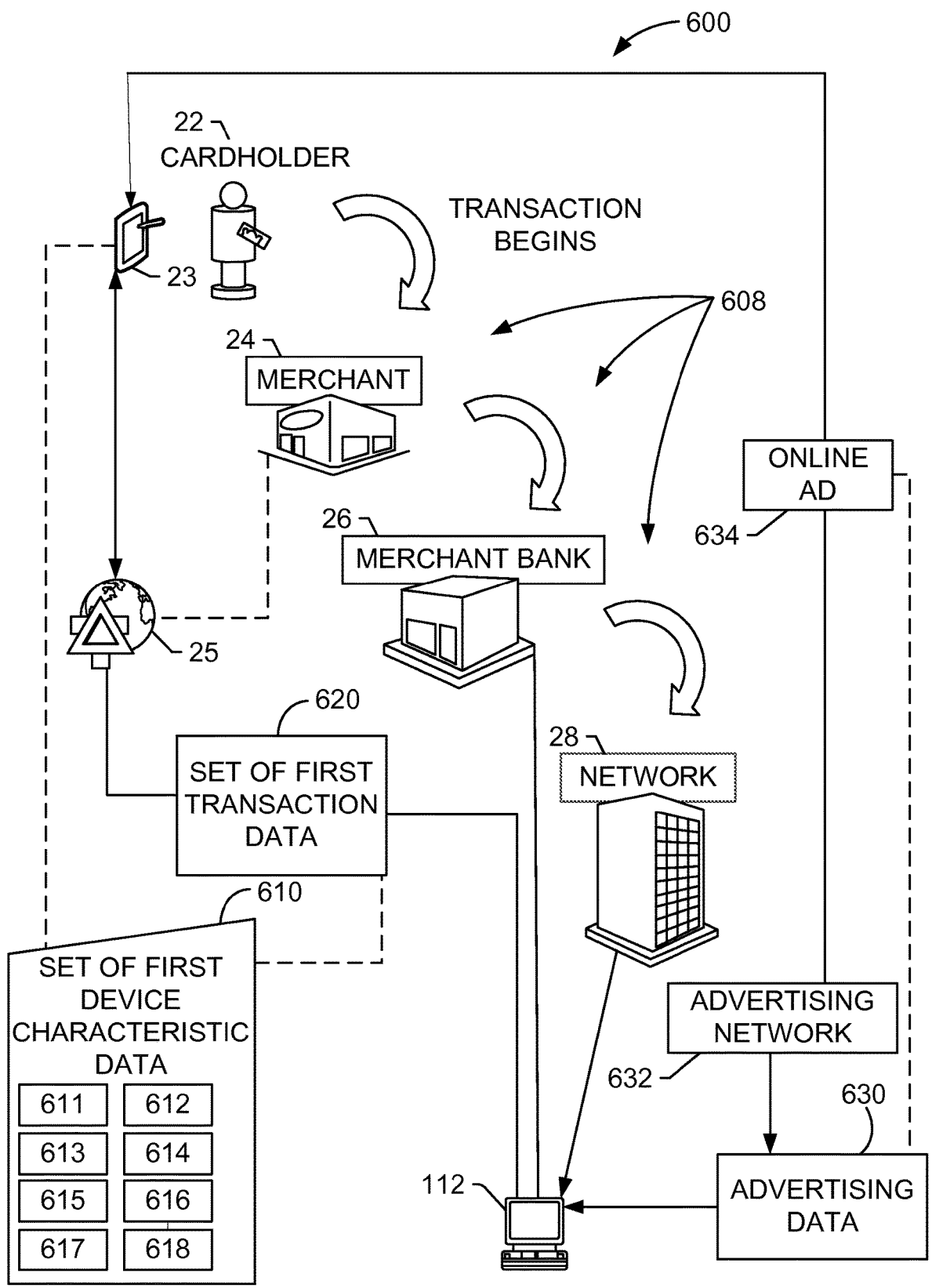

FIG. 6 is a simplified block diagram of an example embodiment of a system 600 for monitoring and receiving a set of first device characteristic data related to cardholder computing device 23 used in payment card transactions. System 600 substantially illustrates a further illustration of multi-party transaction card industry system 20 (shown in FIG. 1). As described above, cardholder 22 uses cardholder computing device 23 to make transactions such as purchases of products from online merchant 25 that is associated with merchant 24. Online merchant 25 may include any online presence associated with merchant 24 including, without limitation, electronic commerce stores, applications used to facilitate transactions with merchants 24, or any other online presence associated with merchant 24 that allows cardholder 22 to purchase products electronically through the use of cardholder computing device 23. In the example embodiment, online merchant 25 is an electronic commerce site associated with merchant 24.

A customer such as cardholder 22 accesses online merchant 25 using a computing resources such as cardholder computing device 23 and makes financial transactions to, for example, purchase or return products from merchant 24. As used herein, cardholder computing device 23 may be any suitable computing device including, for example and without limitation, a desktop computer, a laptop computer, a portable computer, a tablet computer, a smart phone, a personal digital assistant, a hybrid phone/tablet ("phablet"), or any other suitable computing device. Cardholder computing device 23 has a variety of device characteristics. Such device characteristics can be monitored or detected by, for example, cardholder computing device 23 and online merchant 25. Many computing devices are capable of monitoring device characteristics using a variety of standard or customized diagnostic and monitoring software. Further, during network communication between cardholder computing device 23 and online merchant 25, cardholder computing device 23 provides at least some device characteristics to online merchant 25. In alternative embodiments, online merchant 25 may use detection software to detect device characteristics without relying upon cardholder computing device 23 to actively provide such information. In at least one example, online merchant 25 may directly or indirectly place software onto cardholder computing device 23 to determine device characteristics. In the example embodiment, device characteristics are received by online merchant 25 as set of first device characteristic data 610. Set of first device characteristic data 610 includes, for example and without limitation, an operating system 611 used by cardholder computing device 202, a browser operating system 612 used by cardholder computing device 202, a plurality of hardware characteristics 613 associated with cardholder computing device 202, an internet protocol address 614 associated with cardholder computing device 202, an internet service provider 615 associated with cardholder computing device 202, display attributes and characteristics 616 used by a browser used by cardholder computing device 202, configuration attributes 617 used by a browser used by cardholder computing device 202, and software components 618 used by cardholder computing device 202.

By providing such device characteristics to online merchant 25, online merchant 25 can send information or content to cardholder computing device 23 that is appropriate to cardholder computing device 23. For example, at least some web content may be customized to particular hardware configurations depending on screen size and processor speed, to display differently for different font or language settings, and to provide substantially different content depending upon operating system or browser operating system. Accordingly, online merchant 25 may receive device characteristic data pertaining to any of the above device characteristics or any other device characteristic that may be provided by cardholder computing device 23.

As described above, online merchant 25 also monitors and stores transaction data associated with the transaction initiated by cardholder 22. Such information may include, for example and without limitation, the date and time of the transaction, an identifier associated with merchant 24, an identifier associated with online merchant 25, a description of the product involved in the transaction, a categorization of the transaction (e.g., a purchase or a return), a transaction result (e.g., authorization or denial), a value associated with the transaction, and a location of the transaction including the location of cardholder 22 and the location of merchant 24 and online merchant 25. As also described above, such transaction data is exchanged by online merchant 25 during processing through payment systems 118 (shown in FIG. 3) associated with network members 608 including computer systems associated with merchant 24, merchant bank 26, payment network 28, and issuer 30 (shown in FIG. 1). In the example embodiment, such transaction data is stored as set of first transaction data 620. Set of first transaction data 620 also includes set of first device characteristic data 610. In the example embodiment, set of first transaction data 620 is an ISO® 8583 compliant message. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. As described below and herein, ISO® 8583 compliant messages include a plurality of specified locations for storing Private Data Elements. For example, data elements 61, 62, 63, 120, 121, 122, and 123 are all designated as private and can be embedded with data. Accordingly, in at least one example, set of first device characteristic data 610 is embedded in the ISO® 8583 compliant message storing set of first transaction data 620 that is generated when cardholder 22 initiates a transaction at online merchant 25. In the example, operating system information 611, browser operating system information 612, hardware characteristics 613, internet protocol address 614, internet service provider 615, display attributes and characteristics 616, configuration attributes 617, and software components 618 may be stored in Private Data Elements. In other examples, set of first transaction data 620 may use alternate formats and structures from ISO® 8583. In such alternative examples, any suitable methods of embedding set of first device characteristic data 610 into set of first transaction data 620 may be used. Further, in at least some examples, online merchant 25 does not directly receive set of first device characteristic data 610 before generating set of first transaction data 620. In such examples, set of first device characteristic data 610 may be received by other payment systems 118 (shown in FIG. 3) associated with network members 608 including, for example, systems associated with payment network 28. In such examples, set of first transaction data 620 may be altered to embed set of first device characteristic data 610 at, for example, payment systems 118. In such examples, set of first device characteristic data 610 may be sent as a separate message or communication by online merchant 25 or any other entity capable of determining device characteristics associated with cardholder computing device 23.

In the example embodiment, online merchant 25 transmits set of first transaction data 620 to device profiling computer system 112. In alternative examples, device profiling computer system 112 receives set of first transaction data 620 from any payment system 118. In further examples, as described above, device profiling computer system 112 receives set of first device characteristic data 610 separately from set of first transaction data 620 and merges them including, for example, embedding set of first device characteristic data 610 into set of first transaction data 620. In additional examples, as described above, first set of device characteristic data 610 is received at payment systems 118 including, for example, systems associated with payment network 28, and transmitted to device profiling computer system 112.

Additionally, device profiling computer system 112 may receive a plurality of advertising data 630. Plurality of advertising data 630 may be received from, for example, an advertising network 632, online merchant 25, or any other party capable of capturing, receiving, or providing advertising data 630 to device profiling computer system 112. In the example embodiment, plurality of advertising data 630 is transmitted from advertising network 632 to device profiling computer system 112. Further, plurality of advertising data 630 is associated with online advertisements 634 presented to cardholder computing device 23. Plurality of advertising data 630 may include, for example and without limitation, the history of online advertisements 634 presented to cardholder computing device 23 including identifiers for online advertisements 634, online merchants 25 associated with online advertisements 634, times and dates of the presentation of online advertisements 634, and identifiers associated with cardholder computing device 23. Accordingly, plurality of advertising data 630 includes information regarding the display of online advertisements 634 associated with online merchant 25. As described below and herein, plurality of advertising data 630 may be used by device profiling computer system 112 in conjunction with set of first device characteristic data 610 and set of first transaction data 620 to generate analysis regarding cardholder computing device 23 and cardholder 22.

Figure 7:
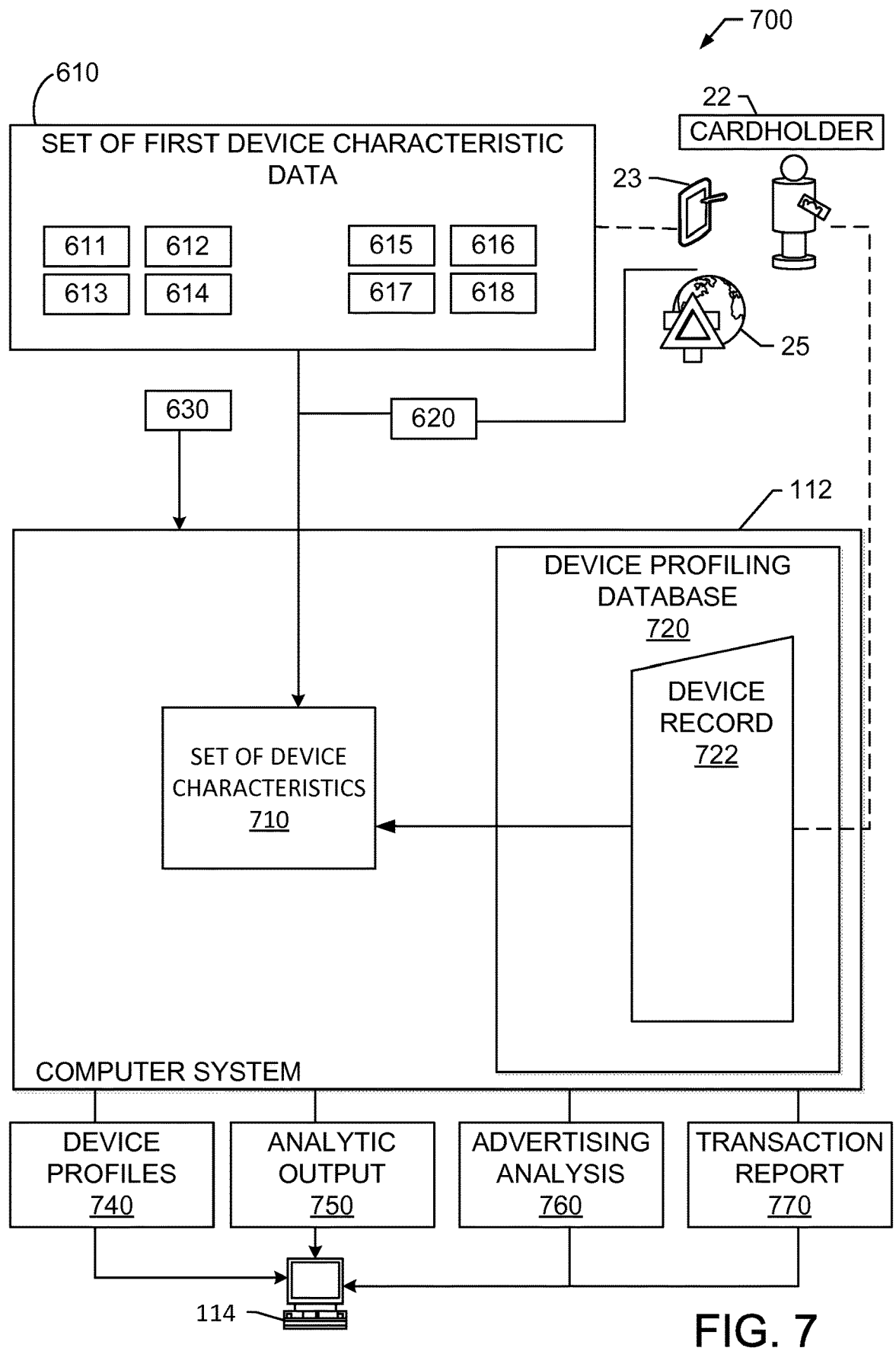

FIG. 7 is a simplified block diagram of an example embodiment of a system 700 for determining and analyzing characteristics of cardholder computing devices, such as cardholder computing device 23, used in payment card transactions. As described above, in the example embodiment, device profiling computer system 112 receives set of first transaction data 620 including set of first device characteristic data 610 embedded within the ISO® 8583 compliant message.

As described above in FIG. 6, in the example embodiment device profiling computer system 112 is in communication with payment systems 118 (shown in FIG. 3) associated with network members 608 (shown in FIG. 6) including payment network 28 (shown in FIG. 6) used to facilitate financial transactions. Accordingly, set of first transaction data 620 may be received at payment network 28 and subsequently routed to device profiling computer system 112.

Set of first device characteristic data 610 may include, for example and without limitation, operating system information 611 associated with cardholder computing device 23, browser operating system information 612 associated with cardholder computing device 23, hardware characteristics 613 associated with cardholder computing device 23, internet protocol address information 614 associated with cardholder computing device 23, internet service provider information 615 associated with cardholder computing device 23, display attributes and characteristics used by a browser 616 used by cardholder computing device 23, configuration attributes used by a browser 617 used by cardholder computing device 23, and software components 618 used by cardholder computing device 23. In one example, set of first device characteristic data 610 may additionally be received from an agent software served to cardholder computing device 23 by, for example, advertising network 632 (shown in FIG. 6), online merchant 25, device profiling computer system 112, and payment systems 118. Such agent software may scan cardholder computing device 23 and provide set of first device characteristic data 610 to any of advertising network 632, online merchant 25, device profiling computer system 112, and payment systems 118.

In one example, operating system information 611 includes versions and subversions associated with a particular operating system distribution running on cardholder computing device 23. For example, the operating system information may include the software development company, the distribution name, the version identifier, the subversion identifier, and the release date for the operating system. Similarly, browser operating system information 612 includes versions and subversions associated with a particular browser operating system distribution running on cardholder computing device 23. Browser operating system information 612 may include the software development, the distribution name, the version identifier, the subversion identifier, and the release date for the browser operating system. Plurality of hardware characteristics 613 may include, for example and without limitation, a manufacturer associated with cardholder computing device 23, a model name or identifier associated with cardholder computing device 23, processor attributes for cardholder computing device 23 such as characteristics of processor 205 (shown in FIG. 4), memory attributes for cardholder computing device 23 such as characteristics of memory 210 (shown in FIG. 4), media input characteristics for cardholder computing device 23 such as characteristics of media input 220 (shown in FIG. 4), media output characteristics for cardholder computing device 23 such as characteristics of media output 215 (shown in FIG. 4), communication interface characteristics for cardholder computing device 23 such as characteristics of communication interface 225 (shown in FIG. 4), screen display characteristics for cardholder computing device 23, storage information for cardholder computing device 23, and any other information related to hardware of cardholder computing device 23.

Internet protocol address information 614 associated with cardholder computing device 23 may be stored in internet protocol version 4, internet protocol version 6, or any other suitable internet protocol capable of identifying the interface and the address location of cardholder computing device 23. Internet service provider information 615 associated with cardholder computing device 23 may be identified using any appropriate identifier.

Display attributes and characteristics 616 may include any information related to the display of information to cardholder 22 on cardholder computing device 23. Accordingly, such display attributes and characteristics 616 may include, without limitation, language selection, time zone selection, time format selection, date format selection, character set format, fonts, font formats, styles, screen resolution, screen color settings, localization settings, other user-defined display settings, and any other display attributes and characteristics used by cardholder computing device 23.

Configuration attributes used by a browser 617 may include, for example and without limitation, the use of browser cookies, browser versions, browser plugins, browser software, script activation for scripts such as JavaScript, MIME type support, and installed browser toolbars. Software components 618 may include, for example and without limitation, any software that is installed on cardholder computing device 23 whether such software is embedded within a browser as a plugin or runs as a stand-alone piece of software.

Device profiling computer system 112 analyzes set of first transaction data 620 to determine a set of device characteristics 710. Device profiling computer system 112 extracts the embedded data from set of first transaction data 620 by searching through set of first transaction data 620 to identify set of device characteristics 710. Set of first transaction data 620 may, as described above and herein, store set of first device characteristic data 610 in a variety of locations such as Private Data Elements in an ISO® 8583 compliant message. Further, set of first device characteristic data 610 may be stored in a variety of formats depending upon the methods and parties involved in creating and storing set of first transaction data 620. For example, different online merchants 25 may encode and store device characteristics 710 in different manners. Accordingly, device profiling computer system 112 may use any appropriate data processing methods and algorithms including, for example and without limitation, natural language processing (NLP) methods, extraction transformation and loading (ETL) methods, lookup tables, linked lists, and any other suitable method or algorithm. Further, depending upon the complexity and formatting of data included in set of first transaction data 620, device profiling computer system 112 may further remove, restructure, or ignore portions of set of first transaction data 620 before determining set of device characteristics 710. In the example embodiment, if set of first transaction data 620 includes any personally identifiable information (PII) data, device profiling computer system 112 will delete, encrypt, or alter the PII data.

Device profiling computer system 112 is also associated with a device profiling database 720. Device profiling database 720 may be stored and executed at device profiling computer system 112 or an external networked computer system such as database 120 (shown in FIG. 2). Device profiling database 720 contains a plurality of device records 722. Each device record 722 is associated with at least one set of device characteristics 710. For example, a particular device record 722 may be written for cardholder computing devices 23 running on Apple™ tablet devices using the Apple iOS™ and serving internet content over Safari™ with a particular set of display attributes. This particular device record 722 further includes a history of transactions associated with the particular set of device characteristics 710 based upon received first set of transaction data 620. Device profiling computer system 112 updates device profiling database 720 with set of device characteristics 710 and transaction data from first set of transaction data 620. Accordingly, a particular device record 722 is updated based upon received set of first transaction data 620. In at least some examples, device profiling computer system 112 further processes set of first transaction data 620 to include details of transactions or categories of transactions within device record 722. For example, device record 722 may include individual entries regarding goods purchased, total amounts of purchase, time and date of purchase, and any other type of transaction data relevant. Additionally, device record 722 may also include information regarding the category of the transaction. For example, device record 722 may include data differentiating between financial transactions that were authorized/approved, declined, fulfilled, charged back, or included customer disputes. For example a set of device records 722 are illustrated below (Table 1):

TABLE 1

| Date | Merchant | Hardware Type | Font | Browser | Transaction Type | Transaction Result |
|---|---|---|---|---|---|---|
| Jan. 1, 2100 | ACME | Laptop | Helvetica | Safari™ | Purchase | Declined |
| Feb. 4, 2100 | ACME | Phablet | Sans Serif | IE™ 7.0 | Return | Authorized |

TABLE 1-continued

| Date | Merchant | Hardware Type | Font | Browser | Transaction Type | Transaction Result |
|---|---|---|---|---|---|---|
| Mar. 6, 2100 | ACME | Smart Phone | Arial | Opera | Purchase | Authorized |

Table 1 is limited in detail due to space constraints. However, as described below, by using device profiling database 720, device profiling computer system 112 may be used to analyze characteristics of cardholder computing devices 23 with regard to transactions with a plurality of online merchants 25. For example, particular a particular set of device characteristics 710 may be more commonly associated with declined transactions. Such information may be beneficial to the operations and support team associated with online merchant 25.

In an example embodiment, device profiling computer system 112 is further configured to generate a plurality of device profiles 740. In a first example, device profiles 740 include the likelihood of a particular cardholder computing device 23 with particular device characteristics 710 to be associated with each transaction category. In a second example, device profiles 740 include the likelihood of a particular cardholder computing device 23 with particular device characteristics 710 purchasing from a particular online merchant 25. In a third example, device profiles 740 include the likelihood of a particular cardholder computing device 23 with particular device characteristics 710 purchasing a particular product or product category from a particular online merchant 25. In a fourth example, device profiles 740 include the likelihood of a particular cardholder computing device 23 with particular device characteristics 710 purchasing from a particular online merchant 25 based upon the presentation of particular online advertisement 634 (shown in FIG. 6). As described further below, this fourth example is facilitated by the incorporate of advertising data 630 into device record 722 and device profiling database 720, more generally.

In at least some examples, device profiling computer system 112 may use internet protocol address information 614 to determine a geographic location associated with cardholder computing device 23. The geographic location may be determined by, for example, online merchant 25, payment systems 118 (shown in FIG. 3) associated with network members 608, and device profiling computer system 112. Such a determination of geographic location may be made using known methods for determining locations based upon internet protocol addresses. In the example embodiment, device profiling computer system 112 determines the geographic location. In other embodiments, the geographic location may be determined by other systems and embedded in the ISO® 8583 compliant message.

In additional examples, device profiling computer system 112 may use internet protocol address information 614 to determine a network context associated with cardholder computing device 23. For example, a particular internet protocol address may identify that cardholder computing device 23 is used in a public network, a home network, or an office network. The network context may be determined by, for example, online merchant 25, payment systems 118, and device profiling computer system 112. Such a determination of network context may be made using known methods for determining locations based upon internet protocol addresses. In the example embodiment, device profiling computer system 112 determines the network context. In other embodiments, the network context may be determined by other systems and embedded in the ISO® 8583 compliant message.

Similarly, device profiling computer system 112 may use internet service provider information 615 may be used to determine the network context associated with cardholder computing device 23 and the geographic location associated with cardholder computing device 23. As above, such geographic location or network context may be determined by online merchant 25, payment systems 118, and device profiling computer system 112. In all examples listed above, such determined geographic location and network context, whether determined by the use of internet protocol address information 614 or internet service provider information 615, may be stored at device profiling database 720 within an associated device record 722.

Device profiling computer system 112 is also configured to analyze device profiling database 720 to generate at least one analytic output 750. Analytic output 750 may include, for example and without limitation, time-segmented reports showing the proportion of cardholder computing devices 23 interacting with an online merchant 25 further segmented by sets of device characteristics 710, time-segmented reports showing the proportion of cardholder computing devices 23 initiating approved financial transactions with an online merchant 25 further segmented by sets of device characteristics 710, time-segmented reports showing the proportion of cardholder computing devices 23 initiating declined financial transactions with an online merchant 25 further segmented by sets of device characteristics 710, and time-segmented reports showing the proportion of cardholder computing devices 23 initiating approved financial transactions that are charged back with an online merchant 25 further segmented by sets of device characteristics 710. In some examples, analytic output 750 is transmitted to a recipient such as an advertiser, an online merchant, a software development company, and an advertising network. The recipient may receive such analytic output 750 on client system 114.

Device profiling computer system 112 also receives a plurality of advertising data 630 associated with online merchant 25. Plurality of advertising data 630 may be received from, for example, advertising network 632 (shown in FIG. 6), online merchant 25, or any other party capable of capturing, receiving, or providing advertising data 630 to device profiling computer system 112. Device profiling computer system 112 processes plurality of advertising data 630 and plurality of device records 722 stored in device profiling database 720 to determine advertising analysis 760. Advertising analysis 760 may include a plurality of conversion rates associated with computing device having configuration attributes of each device record 722. In one example, a conversion rate associated with a particular advertising creative presented to cardholders 22 using a particular configuration of cardholder computing devices 23 may be determined. For example, cardholder computing devices 23 running on Apple™ tablet devices using the Apple iOS™ and serving internet content over Safari™ with a particular set of display attributes may have a conversion rate of 5% for a particular advertising creative while cardholder computing devices 23 running on Samsung™ tablet devices using the Android OS™ and serving internet content over Chrome™ with a particular set of display attributes may have a conversion rate of 7.5%. In this example, an advertiser or a merchant may be able to use such information to more appropriately generate and advertise advertising creatives to the most responsive users. Advertisers or merchants may receive such advertising analysis 760 on client system 114.

Device profiling computer system 112 is further configured to generate a device configuration transaction report 770. Device configuration transaction report 770 includes a plurality of transaction data associated with a plurality of transactions segmented based upon at least one device characteristic. In other words, device configuration transaction report 770 includes a breakdown of transaction types (e.g., authorizations, charge backs, declines) based upon at least one device characteristic.

Accordingly, client system 114 is configured to receive device profiles 740, analytic output 750, advertising analysis 760, and device configuration transaction reports 770. Client system 114 may represent a computer system in networked communication with device profiling computer system 112. Client system 114 may be used by any suitable party including, for example, an advertiser, an ad network, a merchant, a bank, or a payment network.

Figure 8:
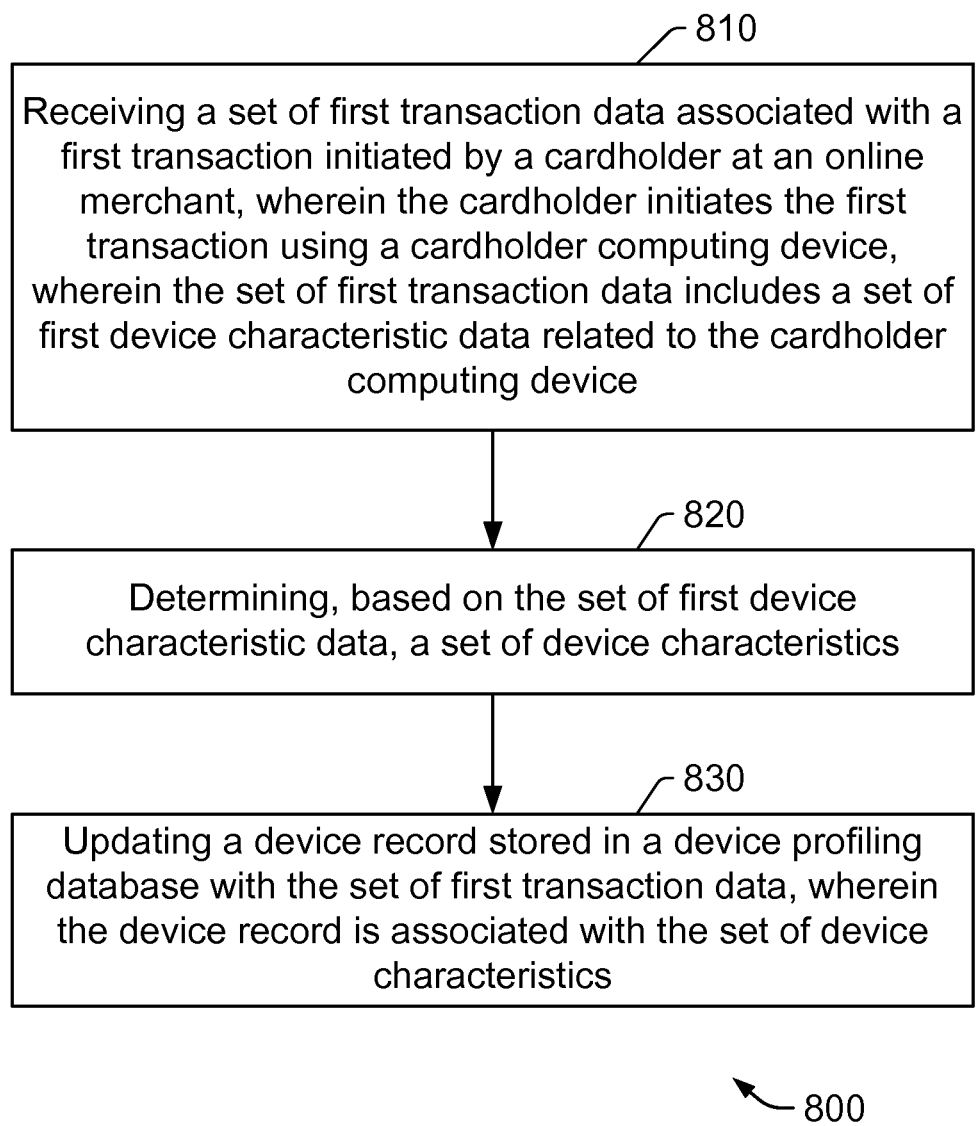

FIG. 8 is a simplified diagram of an example method 800 of determining and analyzing characteristics of devices used in payment transactions using device profiling computer system 112 (shown in FIG. 2). Device profiling computer system 112 receives 810 a set of first transaction data associated with a first transaction initiated by a cardholder at an online merchant, wherein the cardholder initiates the first transaction using a cardholder computing device, wherein the set of first transaction data includes a set of first device characteristic data related to the cardholder computing device. Receiving 810 represents device profiling computer system 112 receiving set of first transaction data 620 (shown in FIG. 6) including set of first device characteristic data 610 (shown in FIG. 6) embedded within, as described above.

Device profiling computer system 112 also determines 820 based on the set of first device characteristic data, a set of device characteristics. Determining 820 represents device profiling computer system 112 determining set of device characteristics 710 (shown in FIG. 7).

Device profiling computer system 112 additionally updates 830 a device record stored in a device profiling database with the set of first transaction data, wherein the device record is associated with the set of device characteristics. Updating 830 represents updating device profiling database 720 (shown in FIG. 7) and more specifically updating device record 722 (shown in FIG. 7).

Figure 9:
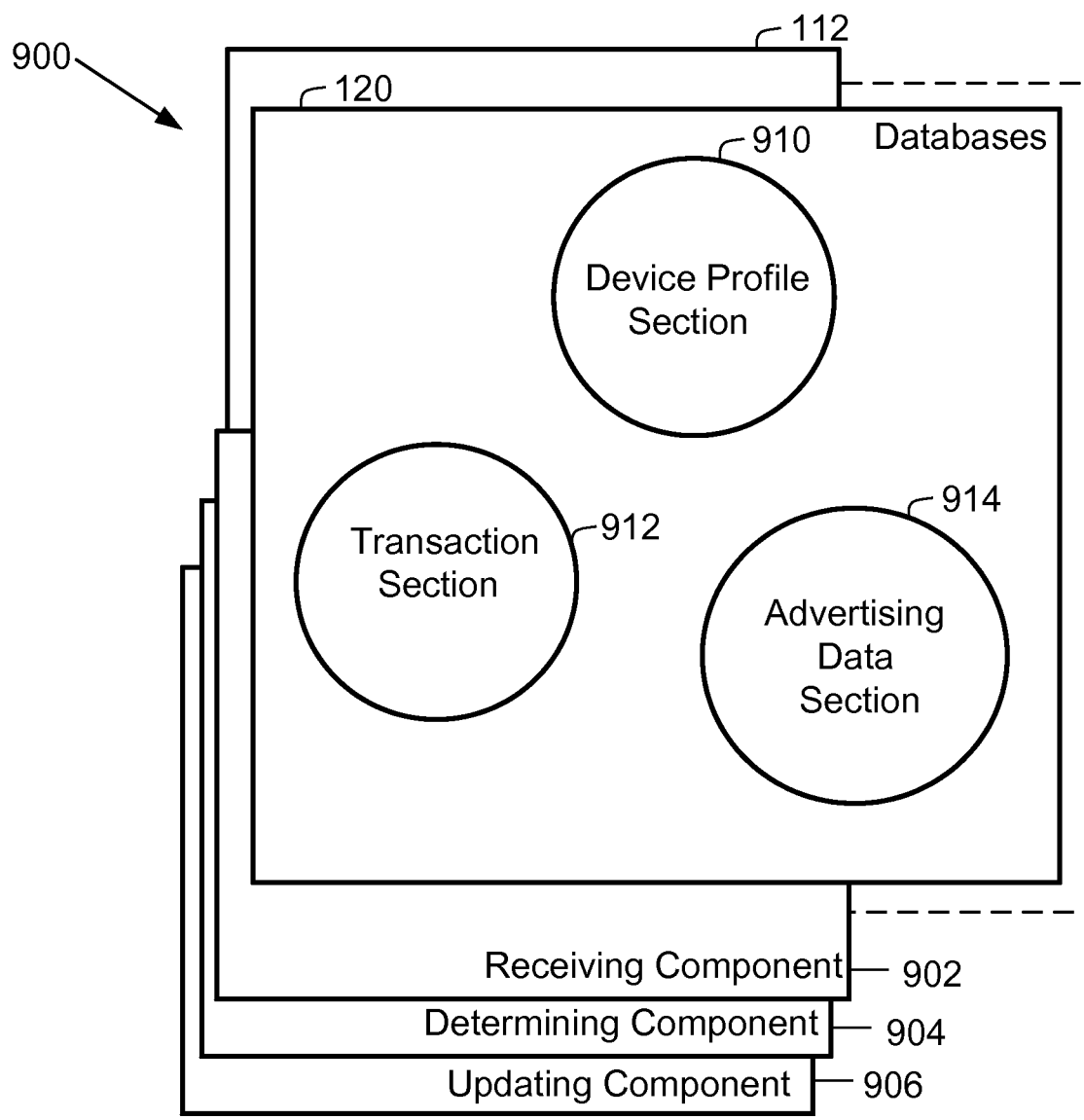

FIG. 9 is a diagram 900 of components of one or more example computing devices that may be used in the environment shown in FIGS. 6 and 7. FIG. 9 further shows a configuration of databases including at least database 120 (shown in FIG. 1). Database 120 is coupled to several separate components within device profiling computer system 112, which perform specific tasks.

Device profiling computer system 112 includes a receiving component 902 for receiving a set of first transaction data associated with a first transaction initiated by a cardholder at an online merchant. Computer system 112 also includes a determining component 904 for determining, based on the set of first device characteristic data, a set of device characteristics. Computer system 112 additionally includes an updating component 906 for updating a device record stored in a device profiling database with the set of first transaction data, wherein the device record is associated with the set of device characteristics.

In an exemplary embodiment, database 120 is divided into a plurality of sections, including but not limited to, a device profile section 910, a transaction data section 912, and an advertising data section 914. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for analyzing device characteristics of computing devices used in online payment transactions along with transaction data implemented by a device profiling computer system in communication with a memory and a device profiling database, the method comprising:

receiving, from a payment network, at the device profiling computer system, a first payment card transaction message that includes both a set of first transaction data and a set of first device characteristic data embedded in private data elements of the first payment card transaction message, the first payment card transaction message being associated with a first payment transaction initiated by a cardholder at an online merchant and configured for being processed over the payment network, wherein the cardholder initiates the first payment transaction using a cardholder computing device in communication with a website of the online merchant, wherein the set of first device characteristic data is captured from the cardholder computing device and represents the operating characteristics of the cardholder computing device, wherein the set of first device characteristic data is embedded in the private data elements of the first payment card transaction message by the online merchant website, wherein the first payment card transaction message is routed from the online merchant website to the device profiling computer system by the payment network, and wherein the payment network is configured to process payment card transactions using a set of proprietary communication standards for the exchange of transaction data and the settlement of funds between financial institutions that are members of the payment network;

extracting, by the device profiling computer system, from the first payment card transaction message, the set of first device characteristic data embedded therein;

analyzing, by the device profiling computer system, the set of first transaction data and the set of first device characteristic data extracted from the first payment card transaction message to generate a set of device characteristics that represent the cardholder computing device associated with the set of first transaction data;

updating the device profiling database by storing a new device record in the device profiling database, the new device record including both the set of first transaction data and the set of device characteristics, wherein the device profiling database includes a plurality of device records including the new device record;

analyzing the plurality of device records stored within the device profiling database; and generating, by the device profiling computer system, an output including at least an analytic output that includes: (i) a first report including a proportion of cardholders initiating declined financial transactions with the online merchant, wherein the proportion of cardholders initiating declined financial transactions are segmented by device characteristics in the first report, (ii) a second report including a proportion of cardholders initiating approved financial transactions with the online merchant that are ultimately charged back, wherein the proportion of cardholders initiating approved financial transactions that are ultimately charged back are segmented by device characteristics in the second report, and (iii) one or more device characteristics requiring further online support by corresponding online merchants, the output indicating that the online merchant is not effectively supporting certain device configurations for online payment transactions.

2. The method of claim 1, wherein generating the set of device characteristics further comprises generating at least one of:

an operating system used by the cardholder computing device in the initiating of the first payment transaction;

a browser operating system used by the cardholder computing device in the initiating of the first payment transaction;

hardware characteristics associated with the cardholder computing device in the initiating of the first payment transaction;

an internet protocol address associated with the cardholder computing device in the initiating of the first payment transaction;

an internee service provider associated with the cardholder computing device in the initiating of the first payment transaction;

display attributes and characteristics used by a browser used by the cardholder computing device in the initiating of the first payment transaction;

configuration attributes used by a browser used by the cardholder computing device in the initiating of the first payment transaction; and software components used by the cardholder computing device in the initiating of the first payment transaction.

3. The method of claim 2, further comprising determining, based upon the internet protocol address, at least one of a geographic location associated with the cardholder computing device and an internet service provider associated with the cardholder computing device.

4. The method of claim 2, further comprising determining, based upon the internet protocol address, a network context associated with the cardholder computing device, wherein the network context corresponds to whether the cardholder is using the cardholder computing device in one of a public network, a home network, and an office network.

5. The method of claim 1, further comprising:

determining a transaction category associated with the first payment transaction based upon the set of first transaction data; and updating the device record with the set of first transaction data and the transaction category, wherein the transaction category is one of a purchase, a return, an authorized transaction, an approved transaction, a declined transaction, a fulfilled transaction, a charged back transaction, and a transaction including a customer dispute, and wherein the new device record includes the transaction category.

6. The method of claim 1, wherein the output further includes a plurality of device profiles, wherein each device profile i) is associated with a particular set of device characteristics and ii) indicates the likelihood that a device having the particular set of device characteristics will participate in at least one transaction category, wherein the transaction category is one of a purchase, a return, an authorized transaction, an approved transaction, a declined transaction, a fulfilled transaction, a charged back transaction, and a transaction including a customer dispute.

7. The method of claim 1, further comprising:

receiving a plurality of advertising data associated with the online merchant, wherein the output includes a conversion rate associated with a computing device having configuration attributes of the device record.

8. The method of claim 1, wherein the output further includes a device configuration transaction report, wherein the device configuration transaction report includes a plurality of transaction data associated with a plurality of transactions segmented based upon at least one device characteristic.

9. The method of claim 1, wherein receiving a first payment card transaction message that includes both the set of first transaction data and the set of first device characteristic data further comprises receiving in an ISO 8583 compliant message containing the set of first transaction data and the set of first device characteristic data.

10. A device profiling computer system for determining and analyzing characteristics of devices used in payment transactions along with transaction data, the computer system comprising:

a processor;

a device profiling database in communication with the processor; and a memory coupled to said processor, said processor configured to:

receive, from a payment network, a first payment card transaction message that includes both a set of first transaction data and a set of first device characteristic data embedded in private data elements of the first payment card transaction message, the first payment card transaction message being associated with a first payment transaction initiated by a cardholder at an online merchant and configured for being processed over the payment network, wherein the cardholder initiates the first payment transaction using a cardholder computing device in communication with a website of the online merchant, wherein the set of first device characteristic data is captured from the cardholder computing device and represents the operating characteristics of the cardholder computing device, wherein the set of first device characteristic data is embedded in the private data elements of the first payment card transaction message by the online merchant website, wherein the first payment card transaction message is routed from the online merchant website to the device profiling computer system by the payment network, and wherein the payment network is configured to process payment card transactions using a set of proprietary communication standards for the exchange of transaction data and the settlement of funds between financial institutions that are members of the payment network;

extract, from the first payment card transaction message, the set of first device characteristic data embedded therein;

analyze the set of first transaction data and the set of first device characteristic data extracted from the first payment card transaction message to generate a set of device characteristics that represent the cardholder computing device associated with the set of first transaction data;

update the device profiling database by storing a new device record in the device profiling database, the new device record including both the set of first transaction data and the set of device characteristics, wherein said device profiling database includes a plurality of device records including the new device record;

analyze the plurality of device records stored within the device profiling database; and generate an output including at least an analytic output that includes: (i) a first report including a proportion of cardholders initiating declined financial transactions with the online merchant, wherein the proportion of cardholders initiating declined financial transactions are segmented by device characteristics in the first report, (ii) a second report including a proportion cardholders initiating approved financial transactions with the online merchant that are ultimately charged back, wherein the proportion of cardholders initiating approved financial transactions that are ultimately charged back are segmented by device characteristics in the second report, and (iii) one or more device characteristics requiring further online support by corresponding online merchants, the output indicating that the online merchant is not effectively supporting certain device configurations for online payment transactions.

11. A device profiling computer system in accordance with claim 10 wherein generating the set of device characteristics includes generating at least one of:

an operating system used by the cardholder computing device in the initiating of the first payment transaction;

a browser operating system used by the cardholder computing device in the initiating of the first payment transaction;

hardware characteristics associated with the cardholder computing device in the initiating of the first payment transaction;

an internet protocol address associated with the cardholder computing device in the initiating of the first payment transaction;

an internet service provider associated with the cardholder computing device in the initiating of the first payment transaction;

display attributes and characteristics used by a browser used by the cardholder computing device in the initiating of the first payment transaction;

configuration attributes used by a browser used by the cardholder computing device in the initiating of the first payment transaction; and software components used by the cardholder computing device in the initiating of the first payment transaction.

12. A device profiling computer system in accordance with claim 11 further configured to:

determine, based upon the Internet protocol address, at least one of a geographic location associated with the cardholder computing device and an internet service provider associated with the cardholder computing device.

13. A device profiling computer system in accordance with claim 11 further configured to:

determine, based upon the internet protocol address, a network context associated with the cardholder computing device, wherein the network context corresponds to whether the cardholder is using the cardholder computing device in one of a public network, a home network, and an office network.

14. A device profiling computer system in accordance with claim 10 further configured to:

determine a transaction category associated with the first payment transaction based upon the set of first transaction data, wherein the transaction category is one of a purchase, a return, an authorized transaction, an approved transaction, a declined transaction, a fulfilled transaction, a charged back transaction, and a transaction including a customer dispute, and wherein the new device record includes the transaction category.

15. A device profiling computer system in accordance with claim 10, wherein the output further includes a plurality of device profiles, wherein each device profile i) is associated with a particular set of device characteristics and ii) indicates the likelihood that a device having the particular set of device characteristics will participate in at least one transaction category, wherein the at least one transaction category is one of a purchase, a return, an authorized transaction, an approved transaction, a declined transaction, a fulfilled transaction, a charged back transaction, and a transaction including a customer dispute.

16. A device profiling computer system in accordance with claim 10 further configured to:

receive a plurality of advertising data associated with the online merchant, wherein the output includes a conversion rate associated with a computing device having configuration attributes of the device record.

17. A device profiling computer system in accordance with claim 10, wherein the output further includes a device configuration transaction report, wherein the device configuration transaction report includes a plurality of transaction data associated with a plurality of transactions segmented based upon at least one device characteristic.

18. A non-transitory computer readable storage media for determining and analyzing characteristics of devices used in payment transactions along with transaction data, the computer readable storage media having computer-executable instructions embodied thereon, wherein, when executed by at least one processor, the computer-executable instructions cause the processor to:

receive, from a payment network, a first payment card transaction message that includes both a set of first transaction data and a set of first device characteristic data embedded in private data elements of the first payment card transaction message, the first payment card transaction message being associated with a first payment transaction initiated by a cardholder at an online merchant and configured for being processed over the payment network, wherein the cardholder initiates the first payment transaction using a cardholder computing device in communication with a website of the online merchant, wherein the set of first device characteristic data is captured from the cardholder computing device and represents the operating characteristics of the cardholder computing device, wherein the set of first device characteristic data is embedded in the private data elements of the first payment card transaction message by the online merchant website, wherein the first payment card transaction message is routed from the online merchant website to the device profiling computer system by the payment network, and wherein the payment network is configured to process payment card transactions using a set of proprietary communication standards for the exchange of transaction data and the settlement of funds between financial institutions that are members of the payment network;

extract, from the first payment card transaction message, the set of first device characteristic data embedded therein;

analyze the set of first transaction data and the set of first device characteristic data extracted from the first payment card transaction message to generate a set of device characteristics that represent the cardholder computing device associated with the set of first transaction data;

update the device profiling database by storing a new device record in the device profiling database, the new device record including both the set of first transaction data and the set of device characteristics, wherein said device profiling database includes a plurality of device records including the new device record;

analyze the plurality of device records stored within the device profiling database; and generate an output including at least an analytic output that includes: (i) a first report including a proportion of cardholders initiating declined financial transactions with the online merchant, wherein the proportion of cardholders initiating declined financial transactions are segmented by device characteristics in the first report, (ii) a second report including a proportion of cardholders initiating approved financial transactions with the online merchant that are ultimately charged back, wherein the proportion of cardholders initiating approved financial transactions that are ultimately charged back are segmented by device characteristics in the second report, and (iii) one or more device characteristics requiring further online support by corresponding online merchants, the output indicating that the online merchant is not effectively supporting certain device configurations for online payment transactions.

* * * * *

UNITED STATES PATENT AND TRADEMARK OFFICE
CERTIFICATE OF CORRECTION

Page 1 of 1

PATENT NO. : 10,733,618 B2
APPLICATION NO. : 14/165627
DATED : August 4, 2020
INVENTOR(S) : Howe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*